United States Patent Office

3,558,542
Patented Jan. 26, 1971

3,558,542
AQUEOUS DISPERSION OF POLYVINYLIDENE CHLORIDE CONTAINING ETHYLENE/VINYL ALKANOATE COPOLYMER AND WAX
John William McDonald, Wilmington, Del., assignor to E. I. du Pont de Nemours and Company, Wilmington, Del., a corporation of Delaware
No Drawing. Filed July 8, 1968, Ser. No. 743,004
Int. Cl. C09j 3/26
U.S. Cl. 260—27         10 Claims

ABSTRACT OF THE DISCLOSURE

A coating based on a polymer of vinylidene chloride and formed from a vinylidene chloride polymer based dispersion has an increased heat-sealable range when an ethylene/vinyl alkanoate copolymer and wax are added thereto. Optionally, other polymeric materials can be added.

BACKGROUND OF THE INVENTION

Field of the invention

This invention relates to polymeric dispersions based on vinylidene chloride polymers and substrates coated therewith.

Prior art

Coatings of vinylidene chloride polymers (PVDC) do not heat-seal to cellulosic materials and will heat-seal to themselves only at very high temperatures. Since vinylidene chloride polymer coatings are limited to high temperature heat-seal applications (about 300° F.), they cannot be used as a heat-sealable moisture barrier coating on heat-sensitive substrates like polyethylene. Vinylidene chloride polymer coating also have a history of poor adhesion development on coating to glassine, thus requiring the use of a primer which serves the dual purpose of increasing adhesion of the vinylidene chloride polymer to glassine and holding "strike-in" of the aqueous vinylidene chloride polymer dispersion into the coating to a minimum.

SUMMARY OF THE INVENTION

According to the present invention there is provided an aqueous dispersion comprising: (1) about 30 to 70% by weight of a vinylidene chloride polymer of at least 70% by weight of vinylidene chloride and up to 30% by weight of at least one other monoethylenically unsaturated comonomer, (2) about 35 to 10% by weight of an ethylene/vinyl alkanoate copolymer of from about 60 to 82% by weight of ethylene and 40 to 18% by weight of vinyl alkanoate, (3) about 35 to 5% by weight of a hydrocarbon wax, and (4) about 0 to 30% by weight of a polymer selected from the group consisting of a polyalkylacrylate, a copolymer of from about 55 to 97% by weight ethylene and about 3 to 45% by weight of an alpha, beta-ethylenically unsaturated carboxylic acid, said copolymer having 5 to 75% of the acid groups neutralized and a glycerol ester of polymerized rosin, the dispersion having a solids content of from about 40 to 65%

There is also provided a coated article comprising: a substrate having the above-described polymeric composition coated on at least one surface.

DETAILED DESCRIPTION OF THE INVENTION

The vinylidene chloride polymers useful in the present invention are the polymers and copolymers of at least 70% by weight of vinylidene chloride with the remainder composed of one or more other monoethylenically unsaturated comonomers. Typical comonomers are vinyl chloride, vinyl acetate, vinyl propionate, acrylonitrile, alkyl aralkyl acrylates having alkyl and aralkyl groups of up to about 8 carbon atoms, acrylic acid, acrylamide, vinyl alkyl ethers, vinyl alkyl ketones, acrolein, allyl esters and ethers, butadiene and chloroprene. Known ternary compositions also can be employed advantageously. Representative of such polymers are those composed of at least 70% by weight of vinylidene chloride with the remainder made up of, for example, acrolein and vinyl chloride, acrylic acid and acrylonitrile, alkyl acrylates and alkyl methacrylates, acrylonitrile and butadiene, acrylonitrile and itaconic acid acrylonitrile and vinyl acetate, vinyl propionate or vinyl chloride, allyl esters or ethers, and vinyl chloride, butadiene and vinyl acetate, vinyl propionate or vinyl chloride, and vinyl ethers and vinyl chloride. Quaternary polymers of similar monomeric compositions can also be used. The dispersion will contain about 30 to 70% by weight of the vinylidene chloride polymer.

The ethylene/vinyl alkanoate copolymers that are useful in the present invention are copolymers which contain from 60 to 82% by weight of ethylene and 40 to 18% by weight of vinyl alkanoate, the acid portion of such vinyl alkanoate containing from 2 to 8 carbon atoms. Useful vinyl alkanoates are vinyl acetate, vinyl propionate, vinyl butyrate, vinyl 2-ethyl hexoate or suitable mixtures thereof. Particularly preferred copolymers are the ethylene/vinyl acetate copolymers containing 18 to 40% vinyl acetate. The dispersion will contain about 10 to 35% by weight of the copolymer, preferably about 15 to 30% by weight.

The waxes useful in the present invention can be of either animal, vegetable or mineral in origin. Waxes which are preferred are the petroleum waxes of natural origin and include both paraffin and microcrystalline waxes. These waxes are mixtures of solid hydrocarbons derived from the fractional distillation of petroleum. After purification, they contain hydrocarbons that fall within the formula range of $C_{23}H_{48}$–$C_{35}H_{72}$. The waxes are hard, colorless and translucent materials having melting points generally in the range of from about 120 to 200° F., preferably, 120 to 180° F. Paraffin waxes are generally preferred over microcrystalline waxes for the present invention because they provide better moistureproofing and are generally of better color. The wax is, of course, not limited to the wax of petroleum origin since waxes having similar properties which are of natural origin, e.g., beeswax and carnauba wax, as well as low molecular weight polyethylene wax (molecular weight of 2,000 to 6,000) can be used alone or in combination with the petroleum waxes. The dispersion usually will contain about 5 to 35% by weight of the wax, but preferably the wax is present at a level of from about 10 to 20% by weight.

The dispersion of the present invention besides containing the above-identified three polymeric components, can also contain another polymer so long as it does not hinder the low-temperature heat-seal properties of the vinylidene chloride polymer-ethylene/vinyl alkanoate copolymer-wax blends. Examples of these other commercially available polymers are polyacrylates, such as alkyl acrylates wherein the alkyl group is from 1 to 4 carbon atoms, a copolymer of ethylene and an alpha, beta-ethylenically unsaturated carboxylic acid wherein the copolymer contains from about 55 to 97% by weight ethylene and about 3 to 45% by weight of the acid, the copolymer having about 5 to 75% of the acid groups neutralized, and a glycerol ester of polymerized rosin.

The dispersion blend of the present invention is readily prepared by stirring together dispersions of the various polymeric components. For example, a polyvinylidene chloride dispersion, which has an acidic pH, and an ethylene/vinyl acetate copolymer-wax dispersion, which has a slightly basic pH, form a stable dispersion having a shelf life greater than two months. The dispersion will generally have a solids content of from about 40 to 65%, preferably 50 to 60%.

The dispersions of the present invention are useful in providing coatings which have a broad heat-sealing range on cellulosic substrates or heat-sensitive substrate, such as polyolefins. The dispersions are usually applied at a coating weight less than 10 pounds/ream. Typical cellulosic substrates are glassines, sulfite paper, kraft paper, pouch stock, newsback board, and regenerated cellulose. Heat-sensitive substrates are the polyolefins such as polyethylene and polypropylene films.

Coatings can be applied by the usual technique, such as by a trailing blade, air knife, kiss, Meyer rod and gravure, and can be applied with one pass or two equivalent passes. The water is removed and the coatings formed by the usual drying techniques.

The coatings derived from dispersion mixtures of polyvinylidene chloride and ethylene/vinyl acetate and wax are found to have a significantly lower heat-seal temperature (coating to coating) than 100% polyvinylidene chloride coatings along with increased adhesion to cellulosic materials such as glassine and sulfite paper. The coatings also have better adhesion to glassine in the presence of water than either a 100% polyvinylidene chloride coating or an ethylene/vinyl acetate copolymer and wax coating.

The invention can be further understood by the following examples in which parts are by weight unless otherwise indicated.

a glycerol ester of polymerized rosin respectively were also added.

The dispersions were applied to 30-pound glassine paper using an aqueous coater at an oven-drying temperature of 240° F. and at web speeds of 10–30 ft./min. The dispersions were metered to the webs with a Meyer rod at the coating weights shown in Table I and formed opaque to clear films as shown by the gloss. Gloss was measured in both the machine direction (M.D.) and transverse direction (T.D.) with a Gardner 75° Glossometer.

The coatings were tested for moisture barrier on both the flat and creased webs, using the TAPPI cup moisture vapor transmission rate method (TAPPI–T 464 M–45). Heat-seal bonds were prepared coating to coated, coating to glassine, and coating to sulfite paper with a Sentinel Heat Sealer at either 200° F. or 250° F. with a one-second dwell and a jaw pressure of 20 p.s.i. The adhesion was determined to be zero, weak, medium, strong or fiber tear (F.T.) by hand pulling the coating from the paper. The results are shown in Table I.

Examples 1 and 2 and the control example were also tested for the adhesion of the coating to glassine paper in the presence of water. Coating adhesion to glassine in the presence of water was evaluated by immersion the coated sheet in water, and testing the adhesion of the coating to glassine after various time intervals. The test was terminated after 20–30 minutes or when the paper began to pull apart. These results are shown in Table II.

TABLE I.—MOISTURE BARRIER AND ADHESIVE PROPERTIES OF PVDC/EVA/WAX BLENDS

| | Blend wt. percent | | | | Percent solids | Gloss 75° | | Coating weight, lbs./3,000 sq. ft. |
|---|---|---|---|---|---|---|---|---|
| | PVDC | EVA 28% VA | Wax | Misc. | | M.D. | T.D. | |
| Example No.: | | | | | | | | |
| Control | 100 | | | | 62 | 83 | 67 | 9.5 |
| 1 | 68 | 16 | 16 | | 58 | 64 | 55 | 8.5 |
| 2 | 50 | 25 | 25 | | 56 | 62 | 53 | 6.5 |
| 3 | 33 | 33 | 33 | | 54 | 70 | 61 | 6.5 |
| 4 | 67 | [1] 24 | 9 | | 58 | 80 | 67 | 8 |
| 5 | 50 | 35 | 15 | | 56 | 80 | 67 | 7.5 |
| 6 | 33 | 47 | 20 | | 54 | 82 | 70 | 7 |
| 7 | 40 | 20 | 10 | [2] 30 | 54 | 78 | 65 | 8 |
| 8 | 40 | 15 | 15 | [3] 30 | 52 | 73 | 62 | 7.5 |
| 9 | 67 | 9 | 9 | [4] 15 | 56 | 76 | 64 | 7 |

| | TAPPI WVTR, g./100 sq. in. 24 hr. | | Adhesion, Peel Strength | | | | | |
|---|---|---|---|---|---|---|---|---|
| | | | Ctg. to Ctg. | | Glassine | | Sulfite | |
| | Flat | Creased | 200° F. | 250° F. | 200° F. | 250° F. | 200° F. | 250° F. |
| Example No: | | | | | | | | |
| Control | 0.10 | 0.10 | 0 | 0 | 0 | 0 | 0 | 0. |
| 1 | 0.18 | 0.55 | Strong | F.T. | 0 | Weak | F.T. | F.T. |
| 2 | 0.20 | 1.1 | F.T. | F.T. | 0 | do | F.T. | F.T. |
| 3 | 0.15 | 0.75 | F.T. | F.T. | 0 | do | F.T. | F.T. |
| 4 | 1.5 | 2.4 | 0 | F.T. | 0 | do | 0 | Medium. |
| 5 | 3.3 | | F.T. | F.T. | 0 | do | Weak | F.T. |
| 6 | 4.3 | | F.T. | F.T. | 0 | do | F.T. | F.T. |
| 7 | >10 | | 0 | F.T. | 0 | do | 0 | F.T. |
| 8 | 2.5 | | 0 | Weak | 0 | do | F.T. | F.T. |
| 9 | 0.8 | | | | | | | |

[1] 18% vinyl acetate.
[2] Polyethylacrylate dispersion (46% solids "Rhoplex" B–15).
[3] Ethylene/methacrylic acid copolymer (11% acid, 30% neutralized).
[4] Glycerol ester of polymerized rosin ("Dresinol" 155).

Examples 1 to 9

From 25 to 50 grams of a 61% solids dispersion of polyvinylidene chloride (PVDC) were mixed with 30 to 60 grams of a 50% solids dispersion of 50 parts ethylene/vinyl acetate (EVA) copolymer (28% vinyl acetate) and 50 parts "Aristowax" 143/150 (a paraffin wax having a melting point of 143–150° F.) to make dispersions containing the ratios of PVDC/EVA/wax shown in Table I. In Example 4, a 50% solids dispersion of 75 parts ethylene/vinyl acetate copolymer (18% vinyl acetate) and 25 parts "Aristowax" 143 wax was used to make a dispersion with the ratio of materials shown in Table I. For Examples 7, 8 and 9, a polyethylacrylate dispersion ("Rhoplex" B–15 46% solids), a partially neutralized ethylene/methacrylic acid copolymer dispersion (44% solids), and TABLE II.—ADHESION OF PVDC/EVA/WAX COATINGS TO GLASSINE PAPER IN THE PRESENCE OF WATER

| Dispersion formulation | | Adhesion to glassine in presence of water |
|---|---|---|
| Example: | | |
| Control | PVDC | Medium. |
| 1 | 67/16/16 PVDC/EVA/Wax | Good. |
| 2 | 33/33/33 PVDC/EVA/Wax | Do. |

What is claimed is:
1. An aqueous dispersion comprising: (1) about 30 to 70% by weight of a vinylidene chloride polymer of at least 70% by weight vinylidene chloride and up to 30% by weight of at least one other monoethylenically unsaturated comonomer, (2) about 35 to 10% by weight of an ethylene/vinyl alkanoate copolymer of from about 60 to 82% by weight ethylene and 40 to 18% by weight vinyl alkanoate, (3) about 35 to 5% by weight of a hydrocarbon wax, and (4) about 0 to 30% by weight of a polymer selected from the group consisting of a polyalkylacrylate, a copolymer of from about 55 to 97% by weight ethylene and about 3 to 45% by weight of an alpha, beta-ethylenically unsaturated acid, the copolymer having about 5 to 75% of the acid groups neutralized, and a glycerol ester of polymerized rosin, said dispersion having a solids content of from about 40 to 65% by weight.

2. The dispersion of claim 1 wherein the vinylidene chloride polymer is polyvinylidene chloride.

3. The dispersion of claim 2 wherein the ethylene/vinyl alkanoate copolymer is a copolymer of ethylene/vinyl acetate.

4. The dispersion of claim 3 wherein the hydrocarbon wax is a paraffin wax having a melting point of 120 to 180° F.

5. The dispersion of claim 4 wherein the ethylene/vinyl acetate copolymer and paraffin wax are present in substantially equal amounts.

6. An article comprising: a cellulosic substrate and a coating on at least one surface of a polymeric blend comprising about 30 to 70% by weight of a vinylidene chloride polymer of at least 70% by weight vinylidene chloride and up to 30% by weight of at least one other monoethylenically unsaturated comonomer, (2) about 35 to 10% by weight of an ethylene/vinyl alkanoate copolymer of from about 60 to 82% by weight ethylene and 40 to 18% by weight vinyl alkanoate, (3) about 35 to 5% by weight of a hydrocarbon wax, and (4) about 0 to 30% by weight of a polymer selected from the group consisting of a polyalkylacrylate, a copolymer of from about 55 to 97% by weight ethylene and about 3 to 45% by weight of an alpha, beta-ethylenically unsaturated acid, the copolymer having about 5 to 75% of the acid groups neutralized and a glycerol ester of polymerized rosin.

7. The article of claim 6 wherein the vinylidene chloride polymer is polyvinylidene chloride.

8. The article of claim 7 wherein the ethylene/vinyl alkanoate copolymer is a copolymer of ethylene and vinyl acetate.

9. The article of claim 8 wherein the hydrocarbon wax is a paraffin wax having a melting point of 120 to 180° F.

10. The article of claim 9 wherein the ethylene/vinyl acetate copolymer and paraffin wax are present in substantially equal amounts.

References Cited

UNITED STATES PATENTS

| 3,025,167 | 3/1962 | Butler | 260—27 |
| 3,322,862 | 5/1967 | Hahns et al. | 260—897 |
| 3,386,936 | 6/1968 | Gordy et al. | 260—27 |

FOREIGN PATENTS

| 950,406 | 2/1964 | Great Britain | 260—27 |

DONALD E. CZAJA, Primary Examiner

W. E. PARKER, Assistant Examiner

U.S. Cl. X.R.

117—145, 168; 260—28.5, 29.6, 884, 899